(12) United States Patent
Bachman

(10) Patent No.: US 10,739,521 B2
(45) Date of Patent: Aug. 11, 2020

(54) WAVEGUIDE SWITCH

(71) Applicant: XIDAS INC., Irvine, CA (US)

(72) Inventor: Mark Bachman, Irvine, CA (US)

(73) Assignee: XIDAS INC., Irvine, CA (US)

( * ) Notice: Subject to any disclaimer, the term of this patent is extended or adjusted under 35 U.S.C. 154(b) by 0 days.

(21) Appl. No.: 16/130,515

(22) Filed: Sep. 13, 2018

(65) Prior Publication Data

US 2019/0146158 A1    May 16, 2019

Related U.S. Application Data

(60) Provisional application No. 62/547,057, filed on Aug. 17, 2017.

(51) Int. Cl.
*G02B 6/35* (2006.01)
*G02B 6/12* (2006.01)

(52) U.S. Cl.
CPC ....... *G02B 6/3598* (2013.01); *G02B 6/12002* (2013.01); *G02B 6/351* (2013.01); *G02B 6/354* (2013.01); *G02B 2006/12145* (2013.01)

(58) Field of Classification Search
CPC .. G02B 6/12002; G02B 6/354; G02B 6/3598; G02B 6/351; G02B 2006/12145
See application file for complete search history.

(56) References Cited

U.S. PATENT DOCUMENTS

| | | | | |
|---|---|---|---|---|
| 6,650,807 B2* | 11/2003 | Wang | ................ | G02B 6/29317 385/147 |
| 2003/0156785 A1* | 8/2003 | Ellis | ..................... | G02B 6/3506 385/25 |
| 2004/0208438 A1* | 10/2004 | Faris | .................... | G02B 6/3556 385/31 |
| 2007/0036480 A1* | 2/2007 | Wu | ..................... | G02B 6/3556 385/16 |
| 2007/0063789 A1* | 3/2007 | Dalconzo | ............ | H01P 1/20345 333/101 |
| 2008/0050063 A1* | 2/2008 | Arioli | .................. | G02B 6/3504 385/16 |
| 2012/0062335 A1* | 3/2012 | Sherrer | .................... | H01P 5/12 333/127 |

FOREIGN PATENT DOCUMENTS

EP            1091231 A2 *    4/2001    ......... G02B 6/29317

* cited by examiner

*Primary Examiner* — Thomas A Hollweg
*Assistant Examiner* — Mary A El-Shammaa
(74) *Attorney, Agent, or Firm* — Nguyen Tarbet

(57) ABSTRACT

A microwave waveguide switch that can route electromagnetic radiation by switching one or more first waveguides into one or more second waveguides. The device utilizes a stacked moveable routing component comprising multiple different routing configurations in a single stack. An external actuator moves the stack in such a way as to align different ports with different signal waveguides thereby achieving different routing states.

7 Claims, 10 Drawing Sheets

WAVEGUIDE SWITCH

CROSS-REFERENCE TO RELATED APPLICATIONS

The present application claims priority to U.S. Provisional Application Ser. No. 62/546,490, entitled "WAVEGUIDE SWITCH," filed Aug. 17, 2017, the contents of which are incorporated herein by reference in their entirety.

FIELD

The subject matter described herein relates generally to a microwave waveguide system that can route electromagnetic radiation by switching one or more waveguides into one or more second waveguides.

BACKGROUND

Waveguides are used to transport electromagnetic radiation from one location to another. For frequencies ranging from 1 to 100 GHz and above (RF, microwave, and millimeter), waveguides are typically constructed of metal enclosures that form a hollow cavity or series of cavities. Electromagnetic radiation is introduced at one or more locations in the cavity system, and extracted at other locations. A simple embodiment of this is a rectangular tube that can transport radiation along the length of the tube, from one end to the other.

For some applications, a waveguide may be made from dielectric material, such as polymer or ceramic. This can have the benefit of providing improved structural integrity for the waveguide, may allow a change of effective impedance for the waveguide, and may enable improved transport of electromagnetic radiation at certain frequencies. Electromagnetic radiation may be contained in the dielectric by total internal reflection at the dielectric/air boundary.

For some applications, waveguides may contain a variety of materials within them to accomplish certain effects, such as filtering, attenuation, coupling or modulation of the electromagnetic wave. Waveguides may include electrically conductive materials, resistive materials, ferromagnetic materials, dielectric materials, as well as gas and vacuum.

The three-dimensional shape of the cavities may be designed to produce special effects, such as filtering, attenuation, coupling, and the like. For example, cavities may be constructed to produce resonating effects that serve to filter or enhance transport of the electromagnetic wave.

A wide variety of devices have been designed and built using three-dimensional waveguides, employing numerous geometries and materials. This is well documented in the literature and understood by those skilled in the art. Many companies currently sell waveguide components intended to transport or modulate electromagnetic radiation.

In many cases there is a desire to move electromagnetic radiation from one portion of a waveguide system to another portion, then at a later time, change the system to move electromagnetic radiation to a different portion of the system. This is done using what is referred to as a waveguide switch.

A waveguide switch contains an intermediary waveguide that is used to connect two other waveguides to each other (each terminating at a port on the waveguide switch). At the desired time, a motor is engaged which moves the intermediary waveguide to connect two different ports to each other. The motor typically rotates the waveguide switch to enable connection to a different port. These waveguide switches enable dynamic control over the routing of electromagnetic radiation in a waveguide system.

Conventional waveguide switches are quite large and bulky, employing a large motor to rotate a machined metal structure 90 degrees. At the starting location, the switch connects two ports to each other. After a rotation of 90 degrees, the switch connects two different ports together. This operation is slow and only permits a limited number of routing configurations.

It is desirable to provide a low cost, small, switching system that can quickly change routing from one waveguide to another, allowing a wide variety of routing configurations.

SUMMARY

The various embodiments provided herein are generally directed to a waveguide switch comprising a moveable component comprising one or more routing waveguides embedded within the moveable component, and which one or more routing waveguides are aligned to one or more external waveguides, allowing electromagnetic radiation to pass from the external waveguides through the embedded routing waveguides. The various embodiments provided herein disclose the use of a moveable component comprising multiple waveguide components that are stacked on each other, and the moveable component moves in a direction perpendicular to the plane of the external waveguides, allowing the routing between waveguides to be changed by moving the intermediary moveable component.

Other systems, methods, features and advantages of the example embodiments will be or will become apparent to one with skill in the art upon examination of the following figures and detailed description.

BRIEF DESCRIPTION OF FIGURES

The details of the example embodiments, including structure and operation, may be gleaned in part by study of the accompanying figures, in which like reference numerals refer to like parts. The components in the figures are not necessarily to scale, emphasis instead being placed upon illustrating the principles of the disclosure. Moreover, all illustrations are intended to convey concepts, where relative sizes, shapes and other detailed attributes may be illustrated schematically rather than literally or precisely.

It should be noted that elements of similar structures or functions are generally represented by like reference numerals for illustrative purpose throughout the figures. It should also be noted that the figures are only intended to facilitate the description of the preferred embodiments.

DETAILED DESCRIPTION

Each of the additional features and teachings disclosed below can be utilized separately or in conjunction with other features and teachings to provide a waveguide switch and methods of manufacture. Representative examples of the embodiments described herein, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the disclosure. Therefore, combinations of features and steps disclosed in the following detail description may not be necessary to practice the disclosure in the broadest sense, and are instead taught merely to particularly describe representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

The various embodiments provided herein are generally directed to a waveguide switch, and variations therein, and methods of manufacturing the waveguide switch.

Figure 1A:
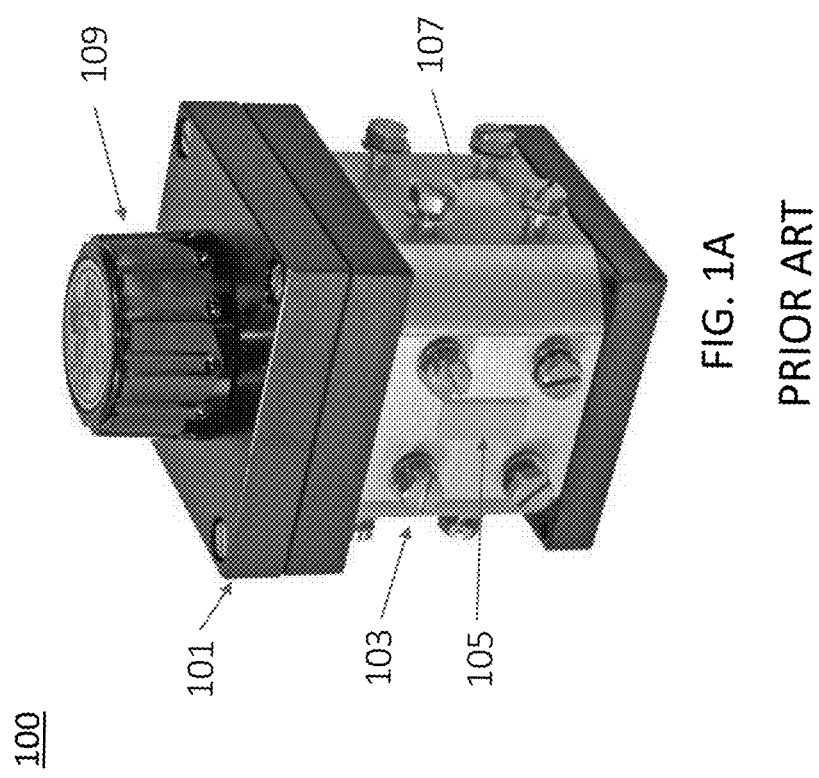
FIG. 1A illustrates a conventional waveguide switch.

FIG. 1A illustrates a conventional waveguide switch 100 comprising two main sections, namely a top section 101 containing a rotating or turning mechanism 109, and a bottom or waveguide section 103 containing routing waveguides. Ports to external waveguide connections are provided as openings 105, 107 in the housing of the bottom section 103). The turning mechanism 109 rotates an internal element that changes the routing of the signals from the external waveguides through the waveguide switch 100. The turning mechanism may be manual or electromechanical.

The waveguide section 103 of the switch 100 includes a rotatable routing component containing routing waveguides that begin at one edge of the routing component and terminate at another edge. The waveguides external to the routing component, called "signal waveguides," are intended to interface with the routing waveguides in the routing component. The rotatable routing component thus provides waveguide routing from primary waveguides to secondary waveguides.

The waveguides in the routing component are referred to herein as routing waveguides. As with the signal waveguides, the routing waveguides may be rectangular tube structures, or may be of another cross sectional shape. Routing waveguides may be hollow (gas or air filled) or comprise a dielectric, and in general are chosen to match the construction of the signal waveguides.

Figure 1B:
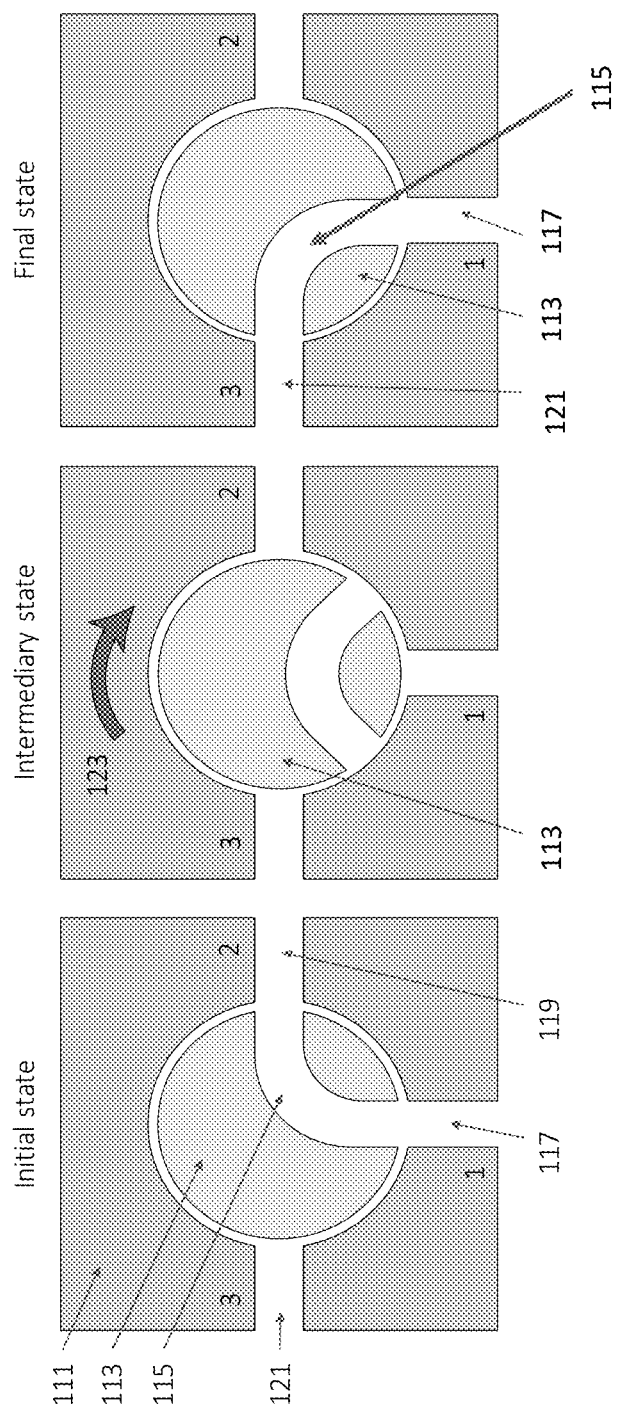
FIG. 1B illustrates operation of a conventional waveguide switch from an initial state to a final state.

FIG. 1B shows how a rotatable routing component 113 inside a waveguide section of a conventional waveguide switch facilitates re-routing between ports. A housing 111 is provided which contains a disc shaped routing component 113 that is free to rotate. The routing component 113 contains a routing waveguide structure 115 fabricated within it. External signal waveguides 117, 119, 121 are fabricated to align with the internal routing waveguide 115. The external signal waveguide openings are called "ports", labelled port #1, port #2, and port #3. The device provides for rotation 123 of the routing component 1113 from an initial state where the routing component 113 is arranged such that the routing waveguide 115 connects ports 1 and 2. The device settles into a final state where the routing component 113 is arranged such that the routing waveguide 115 connects ports 1 and 3.

Figure 2:
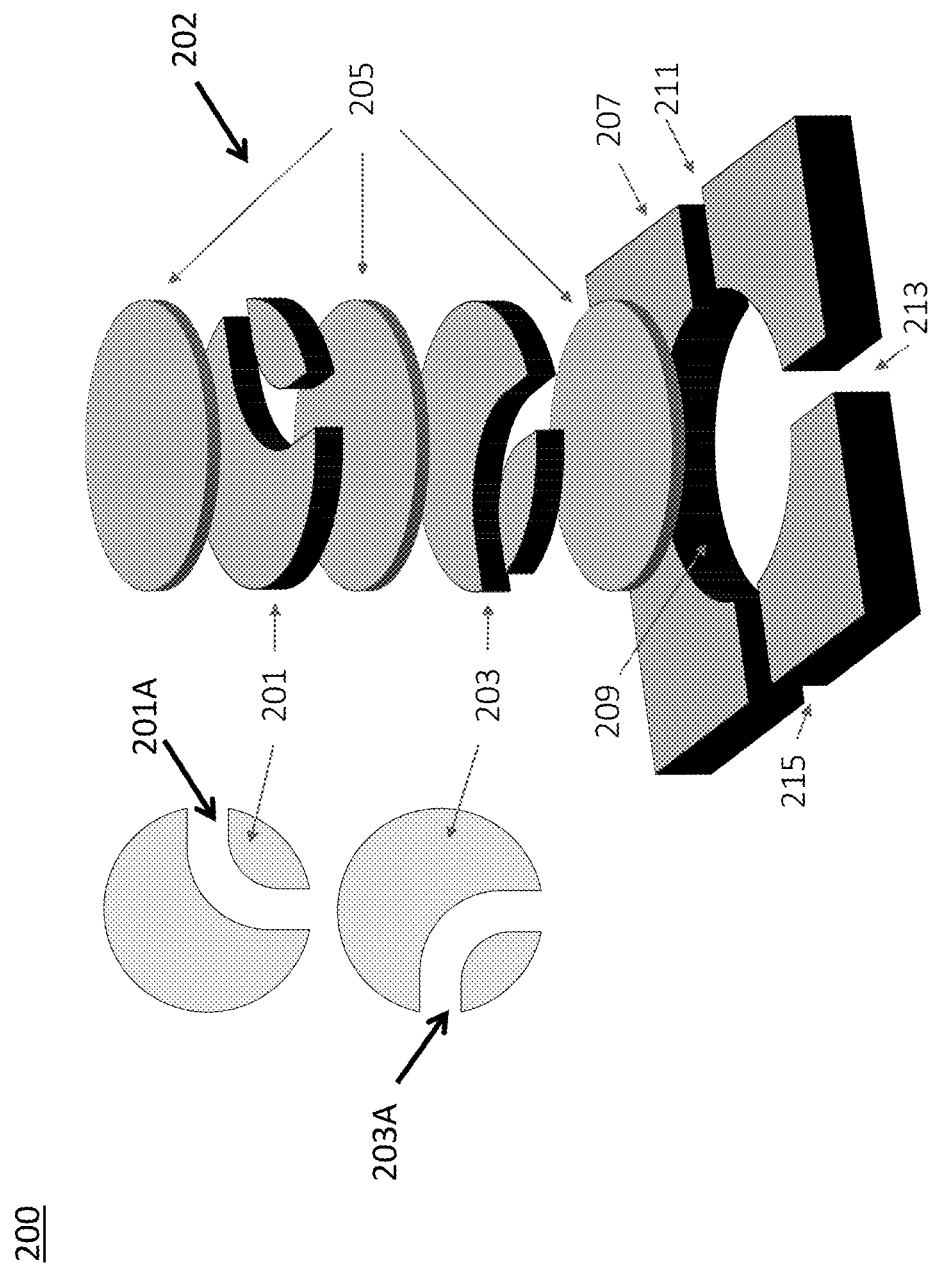
FIG. 2 illustrates an exemplary waveguide switch according to embodiments of the present disclosure.

FIG. 2 illustrates an exemplary waveguide switch 200 according to embodiments of the present disclosure. The exemplary waveguide switch 200 uses two or more routing components 201, 203 moveable in a linear direction and containing one or more internal routing waveguides 201A, 203A intended to connect one or more external or signal waveguides 211, 213, 215. In contrast to the prior art waveguide switch of FIGS. 1A and 1B, the present waveguide switch utilizes two or more moveable routing components 201, 203 that are stacked relative to one another in a direction that is orthogonal to the signal waveguides 211, 213, 215. This is referred to herein as a "stacked moveable routing component," or SMRC. As depicted in FIG. 2, the SMRC 202 includes one or more barrier plates 205 interposing the routing components 201, 203 and/or the routing components 201, 203 interposing the barrier plates 205. The barrier plates 205 are used to electromagnetically isolate each routing component 201, 203 from the other, if desired. The barrier plates 205 may be constructed of metal or other material.

The SMRC 202 may be circular, oval, rectangle, hexagonal and the like in shape. Certain shapes, such as, e.g., those shaped have a straight edge and the like, may be used to assist with alignment of the routing waveguides 201A, 203A within the routing components 201, 203 with the signal waveguides 211, 213, 215.

The SMRC 202 is placed in a waveguide housing 207 containing an opening 209 intended to moveably or slidably hold the SMRC 202. The waveguide housing 207 contains signal waveguides 211, 213, 215 forming ports to the switch 200.

Figures 3A, 3B, 3C:
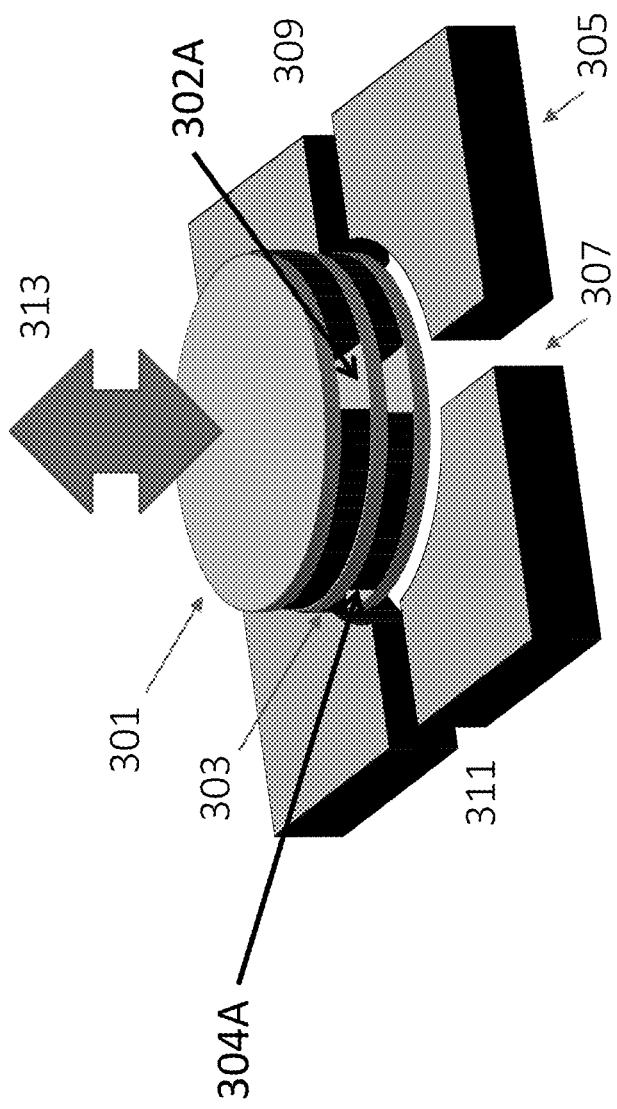
FIG. 3A illustrates an exemplary stacked moveable routing component for a waveguide switch according to embodiments of the present disclosure.
FIGS. 3B and 3C illustrate the operation of the exemplary stacked moveable routing component shown in FIG. 3A.

FIG. 3A illustrates an exemplary stacked moveable routing component (SMRC) 301 according to embodiments of the present disclosure. The SMRC 301 comprises routing components 302, 304 having routing waveguides 302A, 304A and is inserted into an opening 303 formed in a manifold 305 and intended to moveably hold the SMRC 301. The manifold 305 includes signal waveguides 307, 309, 311 that interface with the routing waveguides 302A, 304A. An external actuator (not shown) is used to move the SMRC 301 in a direction 313 orthogonal to the signal waveguides 307, 309, 311. The actuator may move the SMRC 301 to expose the respective routing waveguides 302A, 304A of the first and second routing components 302, 304 to the signal waveguides 307, 309, 311. The actuator may be configured to be in a two-state or multi-state mode, or may move in a continuous manner. When the first routing component 302 is aligned with the signal waveguides 307, 309, 311 as shown in FIG. 3B, the switch is in a first state 315 (State 1). After actuation of the SMRC 301, the second routing component 304 is aligned with the signal waveguides 307, 309, 311 as shown in FIG. 3C, placing the switch in a second state 316 (State 2).

Figure 4:
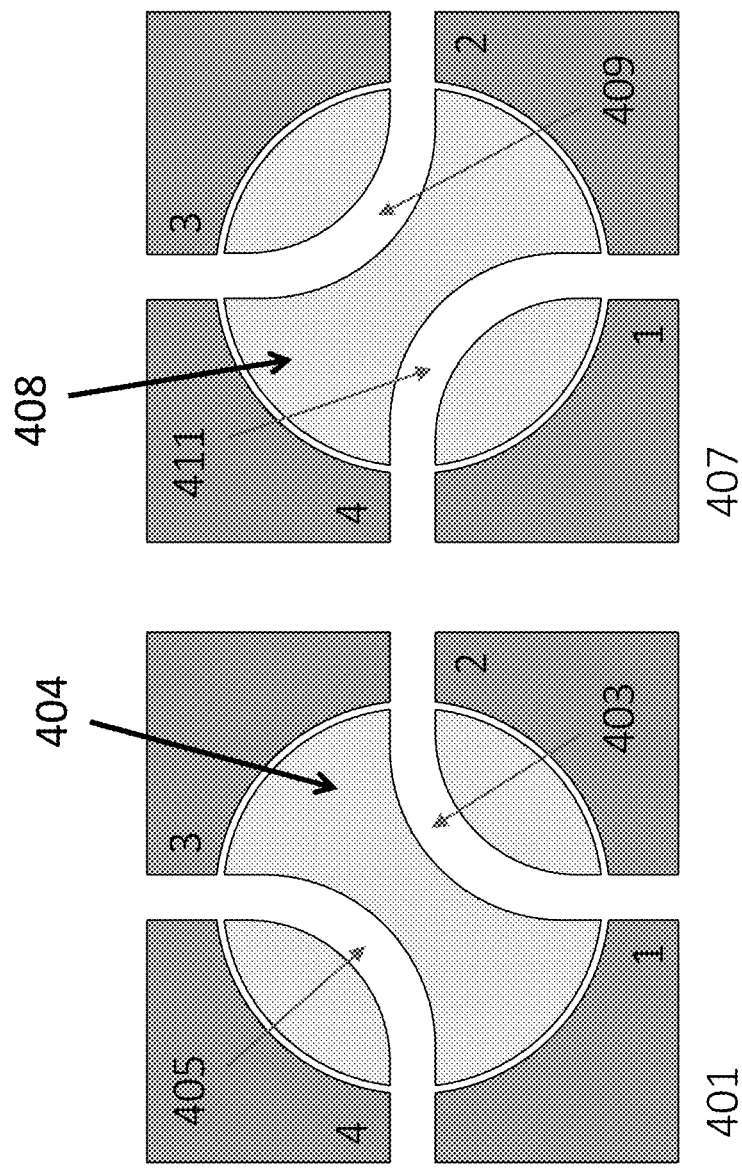
FIG. 4 illustrates an exemplary 2×2 routing configuration according to embodiments of the present disclosure.

FIG. 4 illustrates an exemplary 2×2 routing switch according to one embodiment of the present disclosure. In a first state 401, a routing component 404 is configured to connect port 1 to port 2 via routing waveguide 403, and port 3 to port 4 via routing waveguide 405. In a second state 407, the routing component 408 is configured to connect port 2 to port 3 via routing waveguide 409, and port 1 to port 4 via routing waveguide 411. This provides the function of a 2×2 waveguide routing switch.

Figure 5:
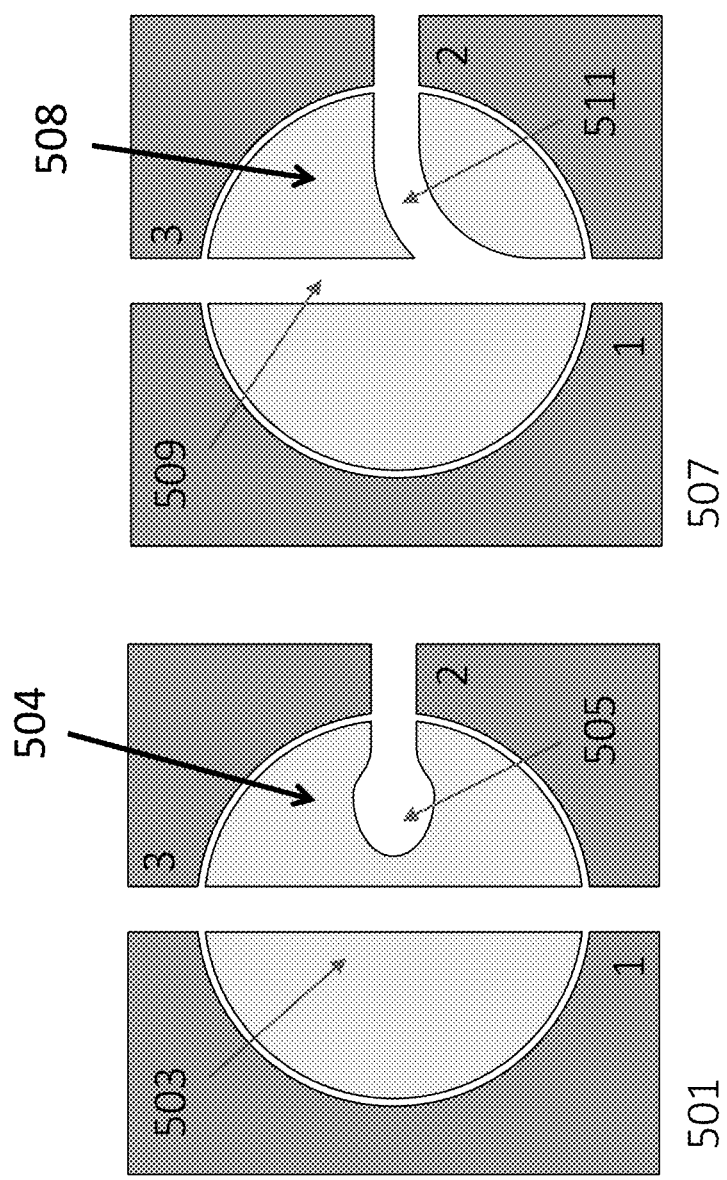
FIG. 5 illustrates an exemplary switchable coupler configuration according to embodiments of the present disclosure.

FIG. 5 illustrates an exemplary switchable coupler according to one embodiment of the present disclosure. In a first state 501, a routing component 504 connects port 1 to port 3 via routing waveguide 503. Port 2 connects to a terminating cavity 505. In a second state 507, the routing component 508 connects port 1 to port 3 via routing waveguide 509, but also allows a connection to port 2 via routing waveguide 511. This provides the function of a switchable coupler.

Figure 6:
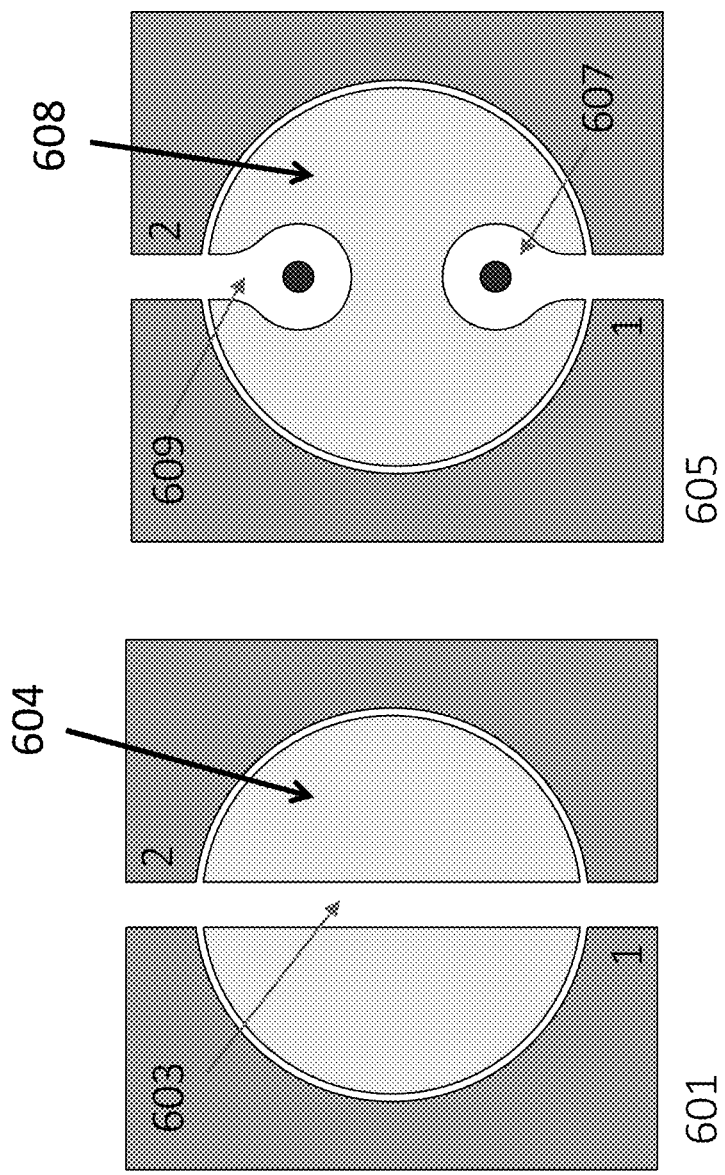
FIG. 6 illustrates an exemplary switchable terminator configuration according to embodiments of the present disclosure.

FIG. 6 illustrates an exemplary switchable terminator according to one embodiment of the present disclosure. In a first state 601, the routing component 604 connects port 1 to port 2 via routing waveguide 603. In a second state 605, port 1 is connected to a terminating cavity 607 and port 2 is also connected to a terminating cavity 609 via routing component 608. This provides the function of a switchable terminator.

Figure 7:
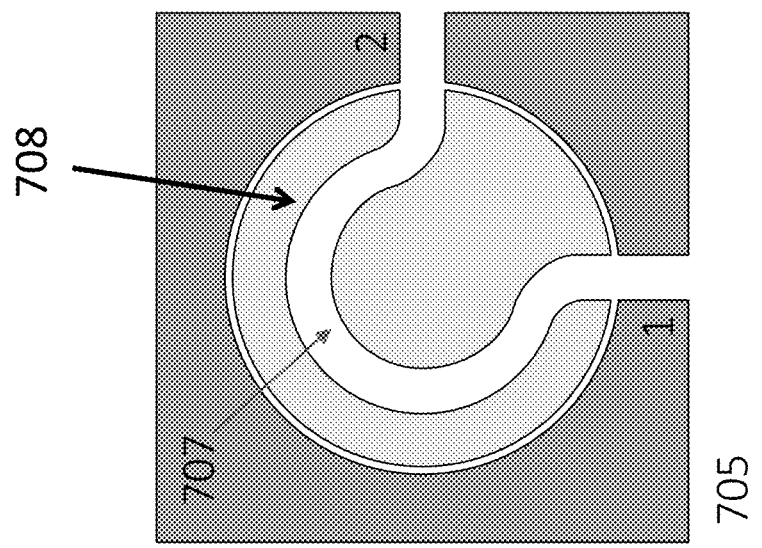
FIG. 7 illustrates an exemplary switchable phase shifter configuration according to embodiments of the present disclosure.
Figure 7:
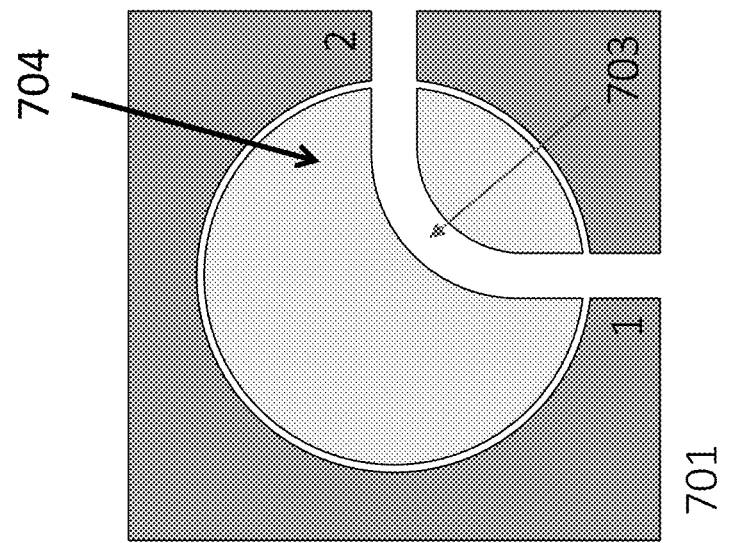

FIG. 7 illustrates an exemplary switchable phase shifter according to one embodiment of the present disclosure. In a first state 701, the routing component 704 connects port 1 to port 2 via a short routing waveguide 703. In a second state 705, the routing component 708 connects port 1 to port 2 via a long routing waveguide 707. This has the effect of increasing the overall path length of the waveguide, thus changing the relative phase. This provides the function of a switchable phase shifter.

Figure 8:
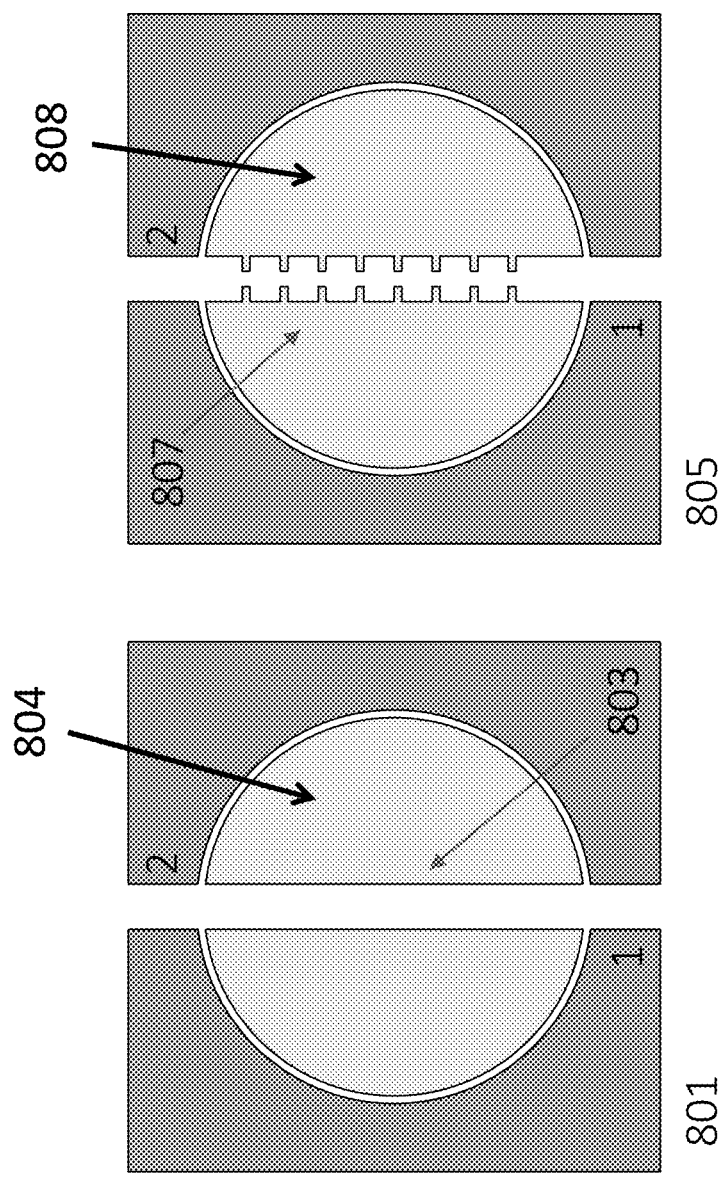
FIG. 8 illustrates an exemplary switchable filter configuration according to embodiments of the present disclosure.

FIG. 8 illustrates an exemplary switchable filter according to embodiments of the present disclosure. In a first state 801, the routing component 804 connects port 1 to port 2 via a short simple waveguide 803. In a second state 805, the routing component 808 connects port 1 to port 2 via a filtering waveguide 807. This provides the function of a switchable filter.

A wide variety of two state configurations can be envisioned using the present SMRC. This list is intended for illustrative purposes to indicate examples of what is possible with this disclosure. Multi-state devices may also be envisioned, since many routing components may be stacked to form a SMRC.

Figure 9:
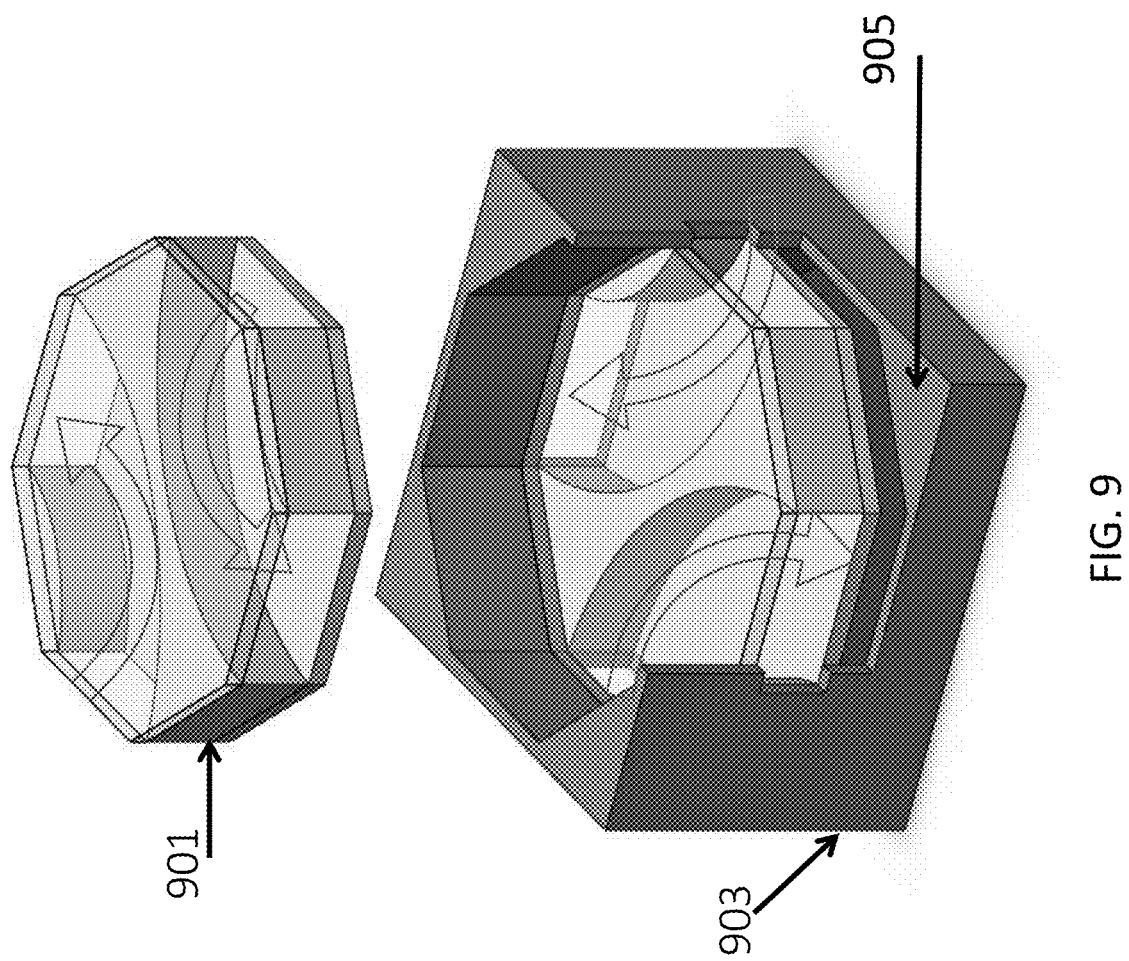
FIG. 9 illustrates an exemplary non-circular stacked moveable element according to embodiments of the present disclosure.

FIG. 9 illustrates an exemplary non-circular stacked moveable element or routing component according to embodiments of the present disclosure. As depicted, the SMRC 901 is not circular in shape. Rather, the SMRC 901 is shown, for exemplary purposes only, in an octagon shape. A number of footprints can be utilized to improve the design or operation, for example, to assist in alignment of the SMRC 901 within a cavity 905 formed in a manifold 903, to enable easier movement, and the like. Moreover, designs may use an SMRC that has more than two intermediate states by adding more routing components to the SMRC.

These examples are illustrative of the various embodiments and additional features that are afforded by the wireless pressure sensor, and are not intended to represent an exhaustive list of features. The example embodiments provided herein, however, are merely intended as illustrative examples and not to be limiting in any way.

All features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. Express recitation of every possible combination and substitution is overly burdensome, especially given that the permissibility of each and every such combination and substitution will be readily recognized by those of ordinary skill in the art upon reading this description.

In many instances entities are described herein as being coupled to other entities. It should be understood that the terms "coupled" and "connected" (or any of their forms are used interchangeably herein and, in both cases, are generic to the direct coupling of two entities (without any non-negligible (e.g., parasitic intervening entities and the indirect coupling of two entities (with one or more non-negligible intervening entities. Where entities are shown as being directly coupled together, or described as coupled together without description of any intervening entity, it should be understood that those entities can be indirectly coupled together as well unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

What is claimed:

1. A waveguide switching apparatus, comprising:
    a manifold comprising a plurality of switching waveguides; and
    a stacked moveable routing component comprising a plurality of routing components stacked relative to one another in a direction orthogonal to the plurality of switching waveguides;
    wherein each of the plurality of routing components having one or more routing waveguides;
    wherein the stacked moveable routing component is positionable in a first state to align the one or more routing waveguides of a first one of the plurality of routing component with a first set of the plurality of switching waveguides, and moveable in a direction orthogonal to the plurality of switching waveguides to a second state to align the one or more routing waveguides of a second one of the plurality of routing components with a second set of the plurality of switching waveguides;

wherein each switching waveguide of the plurality of switching waveguides comprises a hollow structure; and wherein each routing waveguide of the plurality of routing waveguides comprises a hollow structure; and wherein electromagnetic radiation passing through the first set of the plurality of switching waveguides passes through the one or more routing waveguides of only one routing component to reach the second set of the plurality of switching waveguides.

2. The waveguide switching apparatus of claim 1, wherein each routing component of the plurality of routing components is isolated from the other routing component by a barrier plate.

3. The waveguide switching apparatus of claim 2, wherein the barrier plate is metal.

4. The waveguide switching apparatus of claim 1, wherein each routing component is shaped as a disc.

5. The waveguide switching apparatus of claim 1, wherein each routing component is non-circular shaped.

6. The waveguide switching apparatus of claim 1, further comprising an actuator for moving the stacked moveable routing component.

7. A waveguide switching apparatus, comprising:

a manifold comprising a plurality of switching waveguides; and a stacked moveable routing component comprising a plurality of routing components stacked relative to one another in a direction orthogonal to the plurality of switching waveguides;

wherein each of the plurality of routing components having one or more routing waveguides;

wherein the stacked moveable routing component is positionable in a first state to align the one or more routing waveguides of a first one of the plurality of routing component with a first set of the plurality of switching waveguides, and moveable in a direction orthogonal to the plurality of switching waveguides to a second state to align the one or more routing waveguides of a second one of the plurality of routing components with a second set of the plurality of switching waveguides; and wherein electromagnetic radiation passing through the first set of the plurality of switching waveguides passes through the one or more routing waveguides of only one routing component to reach the second set of the plurality of switching waveguides.

* * * * *

UNITED STATES PATENT AND TRADEMARK OFFICE
CERTIFICATE OF CORRECTION

Page 1 of 1

PATENT NO. : 10,739,521 B2
APPLICATION NO. : 16/130515
DATED : August 11, 2020
INVENTOR(S) : Mark Bachman It is certified that error appears in the above-identified patent and that said Letters Patent is hereby corrected as shown below:

On the Title Page

Item (72) under the Inventor information. Please add second Inventor information:
Spencer Chang, Orange, CA (US)

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*